United States Patent [19]

Dearman

[11] Patent Number: 4,666,138
[45] Date of Patent: May 19, 1987

[54] EXTERNAL REFORMING PIPE CLAMP

[76] Inventor: Timothy C. Dearman, P.O. Box 937, Pearland, Tex. 77588

[21] Appl. No.: 773,024

[22] Filed: Sep. 6, 1985

[51] Int. Cl.⁴ .................................................. B25B 1/20
[52] U.S. Cl. ...................................... 269/43; 269/233; 269/287
[58] Field of Search ............................ 269/43, 130–132, 269/108, 287, 232–233; 228/44, 49; 29/281.5

[56] References Cited

U.S. PATENT DOCUMENTS

| | | |
|---|---|---|
| 459,921 | 9/1891 | Wyttenbach .......................... 269/130 |
| 720,816 | 2/1903 | Karl . |
| 1,104,579 | 7/1914 | Thorsby . |
| 1,223,568 | 4/1917 | De Point et al. . |
| 1,569,275 | 1/1926 | Green . |
| 2,674,966 | 4/1954 | Morris . |
| 3,586,057 | 6/1971 | Lambert .............................. 269/132 |
| 3,925,854 | 12/1975 | McFadden ............................ 269/43 |
| 3,944,202 | 3/1976 | Dearman .............................. 269/130 |
| 4,356,615 | 11/1982 | Dearman .............................. 269/43 |

Primary Examiner—Robert C. Watson
Attorney, Agent, or Firm—Learman & McCulloch

[57] ABSTRACT

A pipe clamp for use in welding together a pair of pipe sections having confronting ends adjacent one another comprises arcuate jaws together forming a generally circular body of such diameter as to encircle the pipes with adjacent ends of the jaws spaced by a gap. A force generating jack is carried by one of the jaws adjacent the gap and has a radially reciprocable member to which is secured one end of a flexible force transmitting member which spans the gap and has its other end secured to the other jaw. The force transmitting member is trained around a force conversion member carried by the one jaw which converts radial force to circumferential force enabling the gap to be closed. The jaws are provided with cooperable guides to maintain those ends of the jaws adjacent the gap in circumferential alignment.

17 Claims, 4 Drawing Figures

EXTERNAL REFORMING PIPE CLAMP

This invention relates to a pipe clamp and more particularly to a welder's clamp that may be applied to the confronting ends of a pair of adjacent pipe lengths and reform their shapes to match one another as much as possible.

BACKGROUND OF THE INVENTION

Preparatory to welding a pair of pipe lengths to one another it is conventional to arrange the confronting ends of two pipe lengths adjacent one another substantially in the position in which they are to be welded together. It is more common than not for discrepancies to exist between the configurations of the pipes. That is, the end of one pipe may be more or less round than the other. Thus, if the confronting ends of the pipe lengths are to conform to one another, they must be reshaped or reformed.

Reformation of the confronting ends of pipe sections may be complicated due to differences in wall thickness between the adjacent pipes. For example, the wall of one pipe section having a specified internal or external diameter may be substantially thicker or thinner than the wall of an adjacent pipe section having the same internal or external diameter. For a proper joint to be formed between the two sections, the differences in wall thickness should be compensated for as uniformly as possible around the circumference of the pipe sections.

Following the positioning and reformation of two pipe sections that are to be welded together, it is conventional to tack weld the sections together at circumferentially spaced zones while the pipe sections remain clamped. The tack welding zones should be distributed as evenly as possible over the circumference of the pipe sections so that, when the clamp is removed to complete the welding operation, the tendency of reformed pipes to revert to their original configurations does not result in mismatching of the confronting ends or undue stressing of the tack weldment.

Apparatus constructed in accordance with the invention facilitates the clamping, reformation, and tack welding of pipe sections to one another.

SUMMARY OF THE INVENTION

A clamp constructed in accordance with the invention is adapted to encircle the confronting ends of a pair of adjacent pipe sections that are to be welded to one another. The clamp comprises a pair of arcuate segments or jaws which may be supported in open, caliper-like configuration so as to facilitate the application of the clamp to the pipe segments. Upon application of the clamp segments in encircling relation relative to the two pipe lengths, the clamp segments may be drawn tightly about the two pipe lengths so as to reform and conform their shapes.

Each clamp segment is provided with circumferentially spaced, adjustable screws by means of which any discrepancies in conformation or wall thickness between the confronting ends of the pipe sections may be adjusted.

The mechanism for adjusting the clamp segments between clamping and unclamping positions is of such construction as to avoid interfering with tack welding of the pipe sections to one another while they are maintained in clamped condition.

THE DRAWINGS

A clamp constructed in accordance with a preferred embodiment of the invention is illustrated in the accompanying drawings, wherein.

DETAILED DECRIPTION

Figure 1:
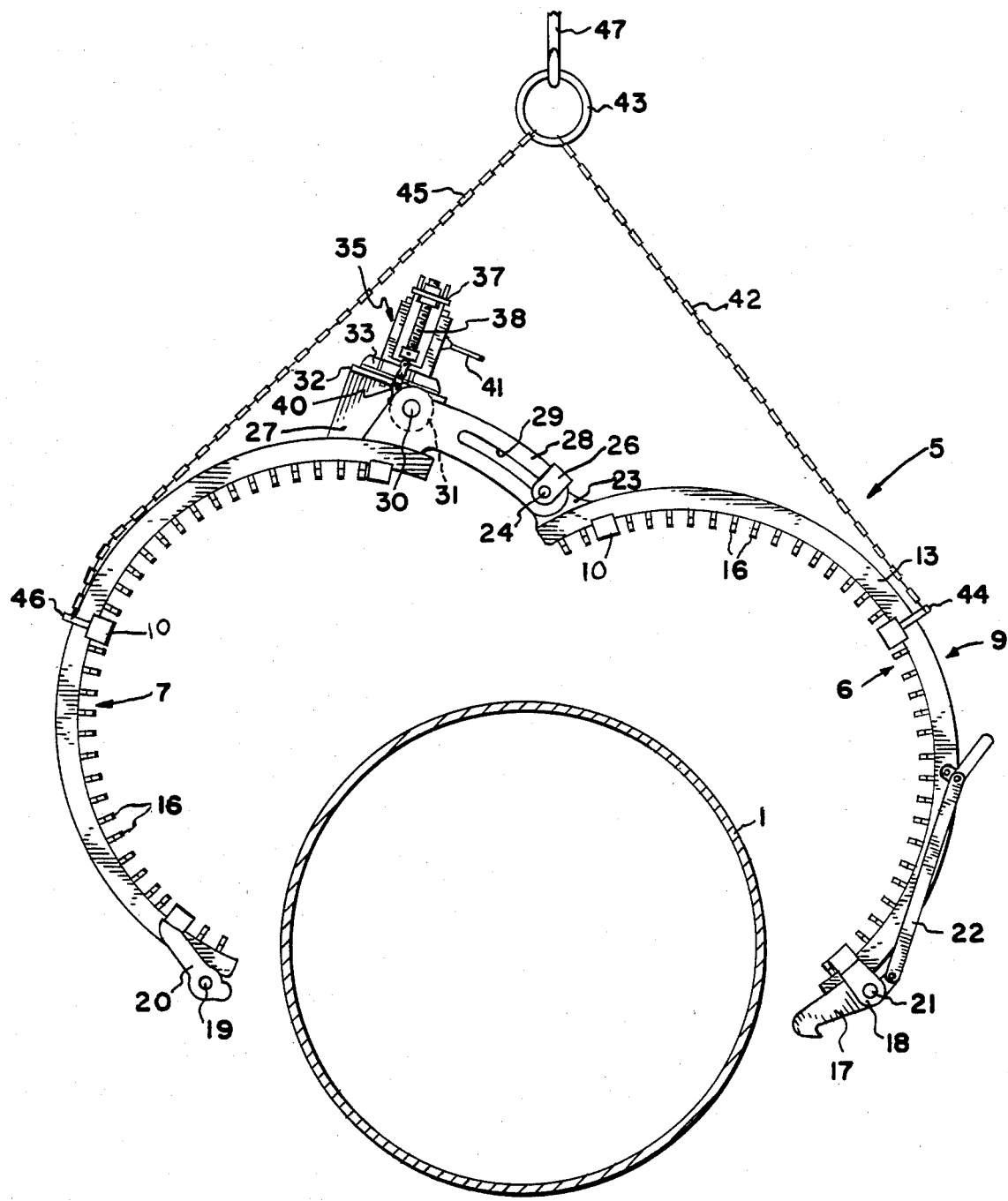
FIG. 1 is an elevational view illustrating the clamp in condition to be applied to or removed from a pipe shown in section.

Apparatus constructed in accordance with the disclosed embodiment of the invention is adapted for use in conjunction with a pair of pipe sections 1 and 2 (FIG. 4) which are to be welded together, the pipes having confronting ends 3 and 4 of beveled or other appropriate form. Conventionally, the ends of the pipe sections are elliptical in shape, rather than truly circular, so if a proper weld is to be made, the confronting ends of the pipe sections must be reformed so as to conform as much as possible to each other. A clamp designated generally by the reference character 5 is provided for this purpose.

The clamp 5 comprises two sets of arcute segments or jaws 6 and 7 which may form a substantially circular clamp body of such diameter as to encircle the respective pipes. The jaw 6 comprises two limbs 8 and 9 (FIG. 4) that are maintained in spaced, parallel relation by cross bars 10. The limb 8 comprises a pair of spaced, parallel arms 11 spaced by a web 12. The limb 9 comprises a pair of similar arms 13 spaced by a web 14. Each of the webs 12 and 14 has fixed thereto circumferentially spaced nuts 15 in each of which is a radially adjustable, force applying screw 16 for a purpose to be explained.

Adjacent one end of each of the limbs the jaw 6 is a latching pawl 17 mounted in a bracket 18 for pivotal movement into and out of latching engagement with a keeper pin 19 mounted in a bracket 20 at the adjacent end of the limbs of the jaw 7. Each latching pawl 17 is pivoted on a pin 21 to which is connected an operating lever 22. the arrangement is such that, as the associated ends of the jaws 6 and 7 approach one another, the pawls 17 enter the brackets 20 and automatically are cammed into latching engagement with the keepers 19. The levers 22 may be manipulated to unlatch the pawls 17 from the keepers 19. The latching and unlatching apparatus disclosed herein is known and forms no part of the invention per se.

At that end of the jaw 6 opposite the latching pawls 17 each of the limbs 8 and 9 is provided with a pair of supports 23 (FIG. 4) spanned by a camshaft 24 on which is a sleeve 25. Carried by each sleeve 25 is a U-shaped guide 26 to which reference will be made hereinafter.

At that end of the jaw 7 adjacent the support brackets 23 are fixed two pairs of parallel, upstanding support plates 27 the outboard ones of which have arms 28 that project circumferentially toward and overlie the adjacent end of jaw 6. Each arms 28 has an arcuate cam slot 29 therein through which extends the camshaft 24 of the associated sleeve 25. Each of the arms 28 also is slideably embraced by one of the guides 26.

Spanning the supports 27 is a shaft 30 on which is journaled a pair of spaced, force conversion wheels or pulleys 31 the purpose of which will be explained hereinafter.

Secured to the supports 27 is a platform 32 on which is fixed the base 33 of a force generating, pressure fluid jack 35 of known construction. The jack 35 has a reciprocable lift member 36 to which is fixed a cross head 37. Extending through openings in the cross head 37 is a pair of threaded bolts 38 which are adjustable relative to the cross head by means of nuts 39. Each bolt is welded to one end of a flexible, force transmitting chain 40 that is trained around the associated pulley 31 and has its other end fixed to the associated sleeve 25. The jack has an operating handle 41 to effect reciprocable movements of the lift member 36 in known manner.

To condition the apparatus for use, a chain 42 having one end coupled to a ring 43 has its other end fixed to a fitting 44 carried by the jaw 6. A similar chain 45 extends between the ring 43 and a similar fitting 46 carried by the jaw 7. The ring may be supported by a hook 47 suspended from a hoist (not shown). When the latch pawls 17 are disengaged from the latch pins 19, and the clamp suspended from the hoist hook 47, the jaws 6 and 7 will assume an open, caliper-like configuration as shown in FIG. 1 in which the camshafts 24 are at the extreme ends of the cam slots 29 in the arms 28, thereby providing a gap 50 between the confronting ends of the jaws 6 and 7. The engagement of the camshafts with the ends of the cam slots limits further widening of the gaps.

The pipes 1 and 2 will be positioned on suitable supports 48 and 49 so that their ends 3 and 4 confront one another. The clamp 5 may be lowered until such time as the upper ends of the jaws 6 and 7 seat on the pipes. As the hoist hook 47 continues to be lowered, the jaws 6 and 7 will close around the pipes until such time as the latch pawls 17 engage and become secured to the keepers 19. This is the position of the clamp shown in FIG. 2, and in this position the jaws 6 and 7 encircle the pipes, but do not impose any clamping force on them because of the existence of the gap 50.

Figure 2:
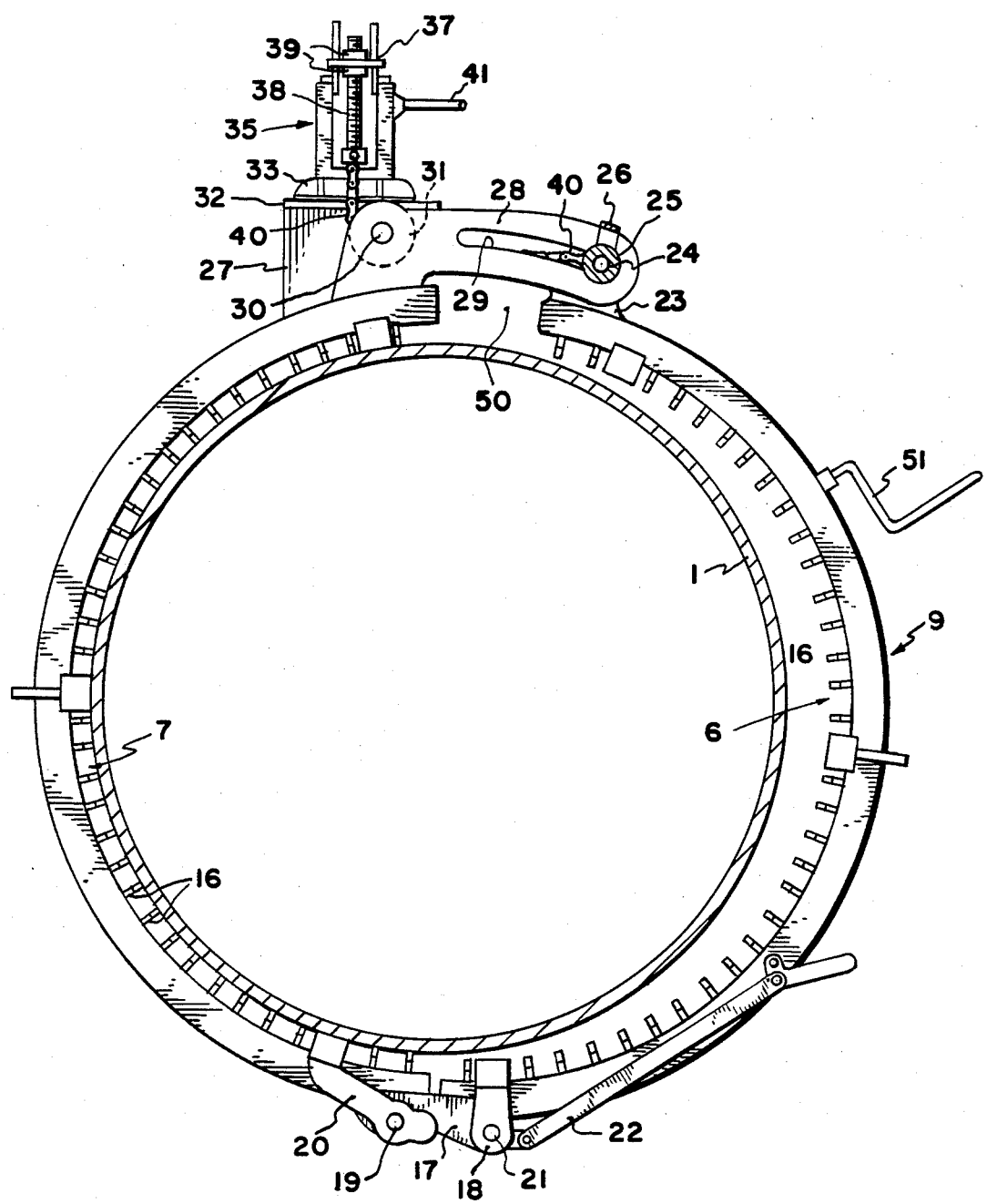
FIG. 2 is a view similar to FIG. 1, but on a larger scale, illustrating the clamp in a preliminary condition of encirclement of the pipe and with certain parts being shown in section.
Figure 3:
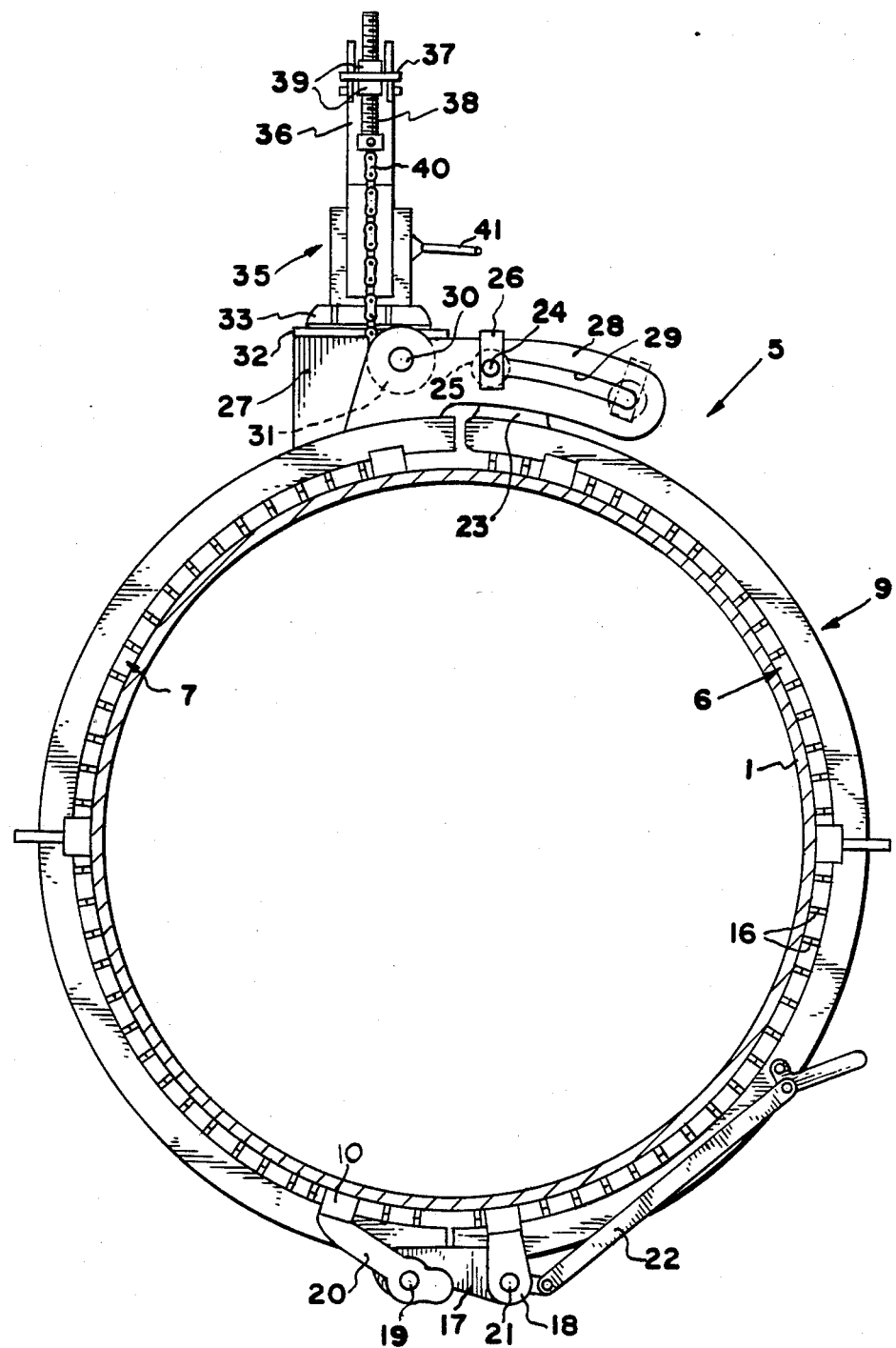
FIG. 3 is a view similar to FIG. 2, but illustrating the clamp in clamping engagement with the pipe sections.

When the clamp is in the position shown in FIG. 2, manipulation of the operating handle 41 of the force generating jack 35 will cause the lift member 36 and the cross head 37 to be extended radially outwardly relative to the clamp. Such movement of the cross head 37 will cause the chains 40 to transmit a force on the sleeves 25, but because of the force conversion pulleys 31, such force will be transmitted circumferentially, rather than radially, so as to cause the jaws 6 and 7 to move relatively to one another in a direction to close the gap 50. See FIG. 3. The arcuate cam slot 29 is formed on a radius having the same center as that of the clamp 5, thereby ensuring that the confronting ends of the jaws will move freely toward one another without binding.

Figure 4:
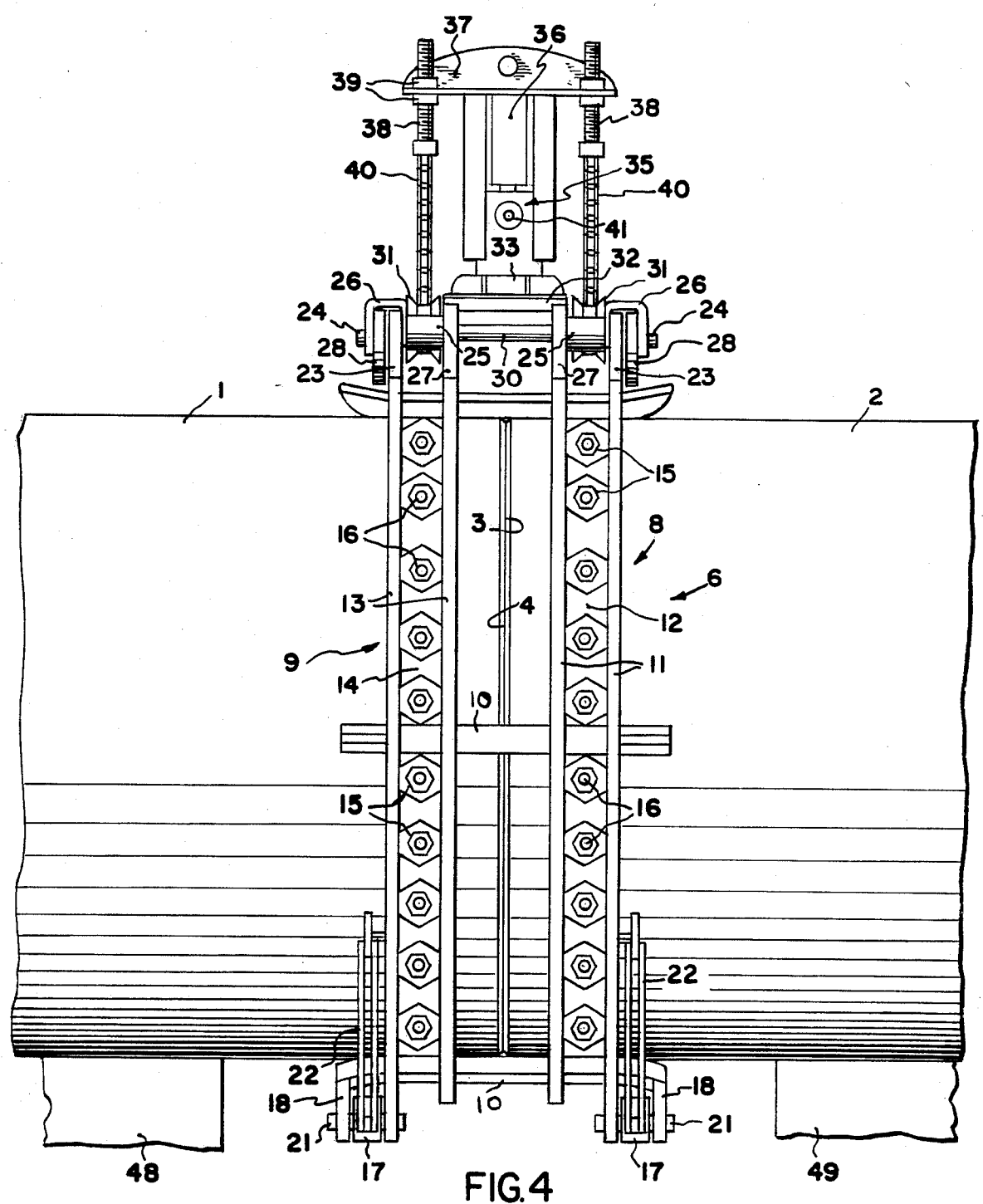
FIG. 4 is a fragmentary, side elevational view of the clamp applied to the two pipe sections.

As is best shown in FIG. 4, the clamp is so positioned on the pipes 1 and 2 that limbs 8 and 9 of the jaw 6 lie at substantially equal distances on opposite sides of the joint between the pipes. The same observation applies to the limbs of the jaw 7. The joint thus is spanned by the cross bars 10 which perform some reforming function as the gap 50 is closed. Should further reformation of the confronting ends of the pipes 1 and 2 be required, the adjustable force applying screws 16 may be manipulated by means of a crank 51 on either side of the joint between the two pipes as is required to conform their configurations as much as possible. The screws 16 also may be used to compensate for differences in wall thickness between the two pipes.

Following clamping of the pipes and reformation of their ends, the tack welding operations may commence. The jack supporting platform 32 is so spaced from the pipes that a welding torch may enter the space between the jack and the pipes. Thus, the only obstruction to the joint between the two pipes is at the regions of the cross bars 10. Consequently, the pipes may be secured together over a sufficiently large circumference to enable them to maintain their reformed shape without risking cracking of the weldment following removal of the clamp.

Removal of the clamp may be effected by return of the lift member 36 of the jack and the cross bar 37 to the positions shown in FIG. 2, followed by the release of the latch pawls 17.

A particularly advantageous characteristic of the invention is that the force transmitting chains 40 may be adjusted precisely via the adjusting bolts 38 so that each chain exerts a uniform force on the limbs 8 and 9 of the jaw 6. Thus, each limb of each jaw may exert the same force on the respective pipe sections 1 and 2.

Another important characteristic of the invention is that the guides 26 and the arms 28 prevent any skewing of the confronting ends of the jaws 6 and 7 as they are moved toward one another under the influence of the force transmitting chains 40. This, coupled with the precision adjustment capability of the chains, facilitates the application of uniform forces on the pipes 1 and 2 by the jaws of the clamp.

The disclosed embodiment is representative of a presently preferred form of the invention, but is intended to be illustrative rather than definitive thereof. The invention is defined in the claims.

I claim:

1. A pipe clamp adapted to encircle and bridge the joint between confronting ends of a pair of pipe sections to be welded together, said clamp comprising arcuate jaws together forming a generally circular clamp body of such diameter as to encircle said pipe sections, said clamp body being interrupted by a variable width gap; force generating means carried by one of said jaws adjacent said gap for reciprocating movements; force transmitting means spanning said gap and interconnecting said force generating means and the other of said jaws for transmitting to the latter a force sufficient to effect relative movement of said jaws in a direction to close said gap; fixed guide means on one of said jaws adjacent said gap and spanning the latter, said guide means having a cam surface; and cam follower means on the other of said jaws and in engagement with said cam surface for guiding said jaws during said relative movement thereof.

2. A pipe clamp according to claim 1 wherein said force generating means comprises a pressure fluid operated jack.

3. A pipe clamp according to claim 2 wherein said jack has a reciprocable part to which said force transmitting means is connected.

4. A pipe clamp according to claim 1 wherein said force transmitting means comprises a chain.

5. A pipe clamp according to claim 1 including force converting means interposed between said force generating means and the other of said jaws, said force converting means comprising a rotatable member carried by said one of said jaws and around which said force transmitting means passes.

6. A pipe clamp according to claim 1 including force applying means carried by said jaws at circumferentially spaced intervals for movements radially of said jaws into and out of engagement with said pipe sections.

7. A pipe clamp according to claim 6 wherein said force applying means comprises screw threaded members having radially inner ends adapted to bear forcibly against said pipe sections.

8. A pipe clamp according to claim 1 wherein said jaws are separable from one another at a zone substantially diametrally opposite said gap, and including releasable latch means carried by said jaws adjacent said zone for releasably coupling said jaws to one another.

9. A pipe clamp according to claim 1 wherein each of said jaws comprises a pair of spaced apart, parallel limbs joined to one another by cross bars.

10. A pipe clamp according to claim 9 wherein each of said limbs includes a pair of parallel bars spaced by a web.

11. A pipe clamp according to claim 10 including a plurality of radially adjustable, circumferentially spaced, force applying members extending through said web for engagement with the associated pipe sections.

12. A pipe clamp according to claim 1 wherein said fixed guide means and said cam follower means are engageable to limit the width of said gap.

13. A reforming pipe clamp adapted to encircle and bridge a joint between a pair of pipe sections arranged end-to-end, said clamp comprising first and second pairs of arcuate jaws each pair of which forms a generally circular member of such diameter as to encicle the respective pipe sections, each of said jaws being interrupted by a gap; cross bars spanning said jaws and maintaining them in spaced apart, parallel relation with the respective gaps in axial alignment; force generating means spanning said jaws and having a reciprocable operating part; means mounting said force generating means on said jaws adjacent said gap for reciprocating movements of said operating part substantially radially of said jaws; a pair of flexible force transmitting members spaced according to the spacing between said jaws and spanning the respective gaps; means securing corresponding ends of said force transmitting members to said operating part; means securing the opposite ends of said force transmitting members to the respective jaws; and force converting means carried by the respective jaws between the ends of said force transmitting means and in engagement therewith for converting radial movement in one direction of said operating part to simultaneous circumferential movement of the respective jaws in a direction to reduce the size of said gaps and enable said jaws forcibly to bear against the respective pipe sections.

14. A pipe clamp according to claim 13 wherein the means securing said force transmitting means to said operating part includes adjustable means operable to adjust the length of the respective force transmitting means independently of one another.

15. A pipe clamp according to claim 13 including cooperable guide means on the respective jaws for guiding the latter during circumferential movement thereof.

16. A pipe clamp according to claim 13 including force applying means carried by said jaws at circumferentially spaced intervals for radial movements into and out of engagement with the respective pipe sections.

17. A pipe clamp according to claim 13 including cooperable guide means fixed on each of said jaws on opposite sides of said gap, said guide means being engageable to limit the width of the associated gap.

* * * * *